UNITED STATES PATENT OFFICE.

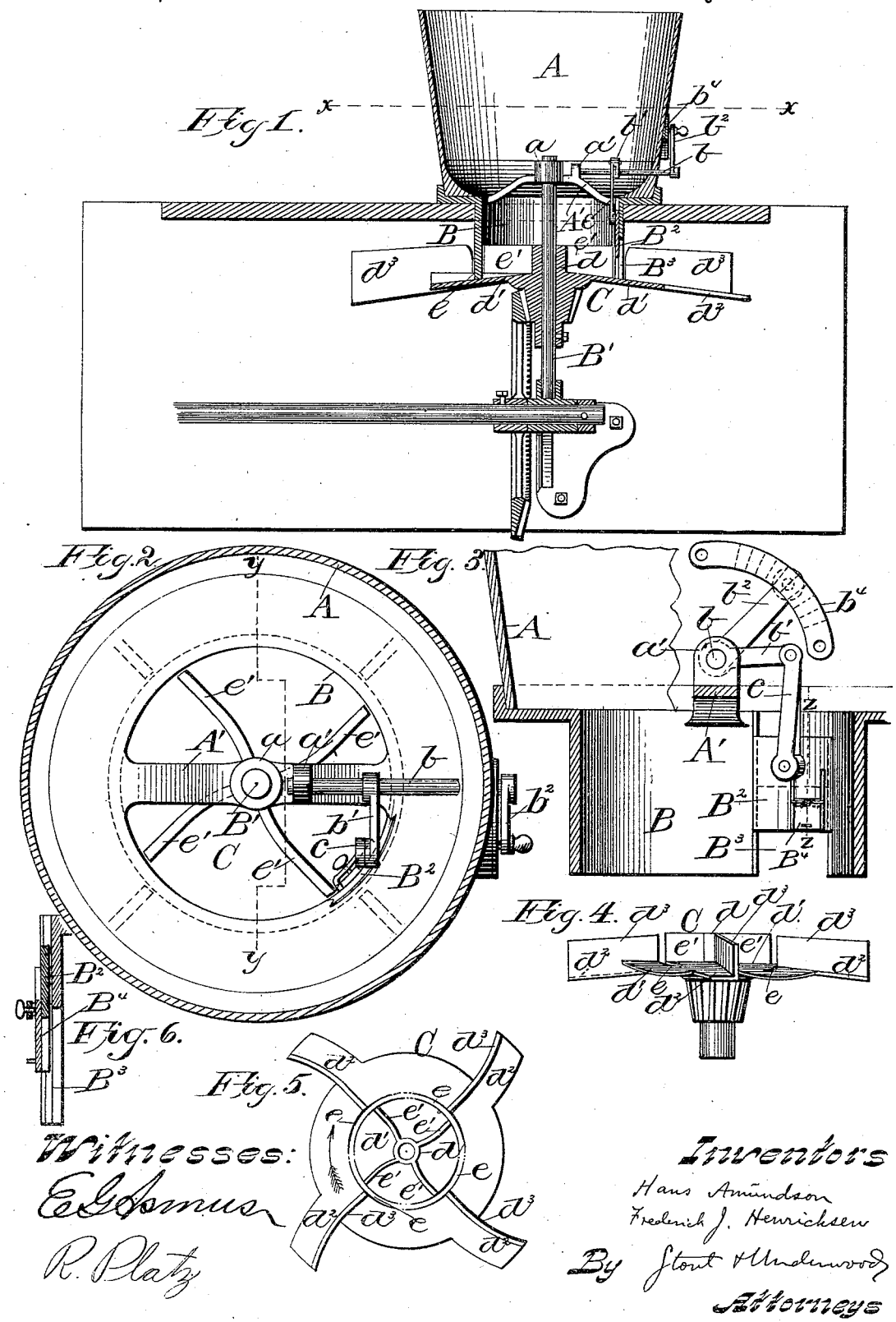

HANS AMŪNDSON AND FREDERICK J. HENRICHSEN, OF RACINE, WISCONSIN.

FORCE-FEED SEED-SOWER.

SPECIFICATION forming part of Letters Patent No. 321,878, dated July 7, 1885.

Application filed February 9, 1885. (No model.)

*To all whom it may concern:*

Be it known that we, HANS AMŪNDSON and FREDERICK J. HENRICHSEN, of Racine, in the county of Racine, and in the State of Wisconsin, have invented certain new and useful Improvements in Force-Feed Seed-Sowers; and we do hereby declare that the following is a full, clear, and exact description thereof.

Our invention relates to seed-sowers, and will be fully described hereinafter.

In the drawings, Figure 1 is a vertical transverse section through the center of our improved seed-sower. Fig. 2 is a section on line $x\,x$, Fig. 1. Fig. 3 is a vertical section on line $y\,y$ of Fig. 2. Figs. 4 and 5 are details of the distributer, and Fig. 6 is a detail on the line $z\,z$ of Fig. 3.

A is the upper hopper. B is the lower hopper, and C the distributer. A bar, A′, arches from one side to the other of the lower hopper, and is formed with a hub, $a$, that the upper end of the driving-shaft B′ projects up into and is centered by. This bar A′ is also formed with a lug, $a'$, that is bored to take the inner end of shaft, $b$, which latter has two arms, $b'$ and $b^2$. A link, $c$, is suspended from the outer end of arm, $b'$, and from the lower end of this link a gate, B², is suspended, which gate is designed to cover partly or entirely, as may be desired, an opening, B³, in the vertical portion of the lower hopper, B, and thus regulate the flow of the seed or fertilizer to the outer portion of the distributer C. This distributer C is made with a central hub, $d$, surrounded by a slightly-convex disk, $d'$, from which slightly-curved arms $d^2$ radiate, and these arms are formed with flanges $d^3$, that extend over into the disk and terminate each at a groove, $e$, breaking joints with slightly-curved flanges $e'$, that radiate from the center of the disk, and also terminate each at a groove, $e$, so that when the disk $d'$ is in place, as shown in Fig. 1, the rim of the lower hopper passes down into the groove $e$ and forms a chamber that incloses the flanges $e'$. The seed to be sown falls from the upper hopper, and from thence, as the distributer revolves, is carried by centrifugal force out through the opening B³ in front of the flanges $d^3$, which distribute it.

It will be observed that though the flanges $e'$ and $d^3$ are on the same plate the flanges $e'$ are so disposed that each flange $e'$ reaches the exit-opening before its companion flange, $d^3$, so that by the time the latter reaches the opening B³ its cast of seed is ready for it.

The arm $b^2$ of shaft $b$ turns on a quadrant, $b^4$, which is scaled, as shown in Fig. 3, so that the height of the gate B² may be indicated by the position of the arm $b^2$ on the quadrant.

We may provide the lower hopper with any desired number of exits B³ and corresponding gates; and we propose in practice to have more than one, to adapt the machine for sowing different seeds and fertilizers.

Though we have spoken of an upper and lower hopper, we may make the two hoppers in one piece without departing from the spirit of our invention. We may put a smaller gate, B⁴, on the gate B² to serve for very fine seed.

The disk $d'$ is formed of four inclined plates, the highest point of each incline beginning at one flange $d^3$, and its lowest point terminating at the next flange $d^3$, and so on all around the disk, and, therefore, as the base-lines of the grooves $e$ must all be in the same horizontal plane, (in order to insure a tight joint with the base of the lower hopper, B, all around,) it follows that the said grooves will be interrupted, as shown in Fig. 5, and intersected with raised surfaces on the disk $d'$, whenever the inclined plates of said disk fall below the plane of the base-line of said grooves.

Having thus fully described our invention, what we claim as new, and desire to secure by Letters Patent, is—

1. In a seed-sower, a hopper projecting below the floor of the machine, said lower part having an exit-opening for the seed or fertilizer, in combination with a vertically-moving gate suspended by a link from the outer end of an arm on a horizontal shaft mounted within the upper portion of the hopper above the floor, said shaft extending outside of the hopper and having another arm turning on a sealed quadrant on the outside of said hopper, as set forth.

2. The hopper having exit-opening, in combination with the distributer having an interior and exterior set of flanges, the flanges in the two sets breaking joints, as described.

3. The distributer having convex plate, flanges breaking joints, and casting-arms, in combination with the hopper separating the two sets of flanges, as set forth.

4. In a seed or fertilizer sower, a hopper that projects below the floor of the machine, in combination with a distributer having compartments on its upper side formed by curved radial flanges, and radial arms having flanges that break joints with the said compartment-flanges for receiving the seed, &c., as it passes from these compartments through an opening in the hopper, as set forth.

In testimony that we claim the foregoing we have hereunto set our hands at Racine, in the county of Racine and State of Wisconsin, in the presence of two witnesses.

HANS AMUNDSON.
FREDERICK J. HENRICHSEN.

Witnesses:
  STANLEY S. STOUT,
  H. G. UNDERWOOD.